United States Patent
Glick et al.

(10) Patent No.: US 10,547,637 B1
(45) Date of Patent: Jan. 28, 2020

(54) SYSTEMS AND METHODS FOR AUTOMATICALLY BLOCKING WEB PROXY AUTO-DISCOVERY PROTOCOL (WPAD) ATTACKS

(71) Applicant: Symantec Corporation, Mountain View, CA (US)

(72) Inventors: Adam Glick, Culver City, CA (US); Akshata Krishnamoorthy Rao, Mountain View, CA (US); Feng Li, Ontario (CA); Douglas Schlatter, Playa Vista, CA (US)

(73) Assignee: CA, Inc., San Jose, CA (US)

( * ) Notice: Subject to any disclaimer, the term of this patent is extended or adjusted under 35 U.S.C. 154(b) by 217 days.

(21) Appl. No.: 15/424,909

(22) Filed: Feb. 6, 2017

(51) Int. Cl.
*H04L 29/06* (2006.01)

(52) U.S. Cl.
CPC ........ *H04L 63/1483* (2013.01); *H04L 63/101* (2013.01); *H04L 63/1416* (2013.01)

(58) Field of Classification Search
CPC H04L 63/1483; H04L 63/101; H04L 63/1416
USPC .......................................................... 726/23
See application file for complete search history.

(56) References Cited

U.S. PATENT DOCUMENTS

| | | | | |
|---|---|---|---|---|
| 2005/0235044 A1* | 10/2005 | Tazuma | ............ | G06F 17/30887 709/217 |
| 2006/0031394 A1* | 2/2006 | Tazuma | ............ | G06F 17/30887 709/217 |
| 2011/0246633 A1* | 10/2011 | Khosravi | ............ | H04L 67/2819 709/223 |
| 2017/0279846 A1* | 9/2017 | Osterweil | ........... | G06F 17/3053 |
| 2018/0013788 A1* | 1/2018 | Vissamsetty | ........ | H04L 63/1466 |
| 2018/0020002 A1* | 1/2018 | Duca | ..................... | H04L 63/101 |

OTHER PUBLICATIONS

Web Proxy Autodiscovery Protocol; Dec. 23, 2016; https://en.wikipedia.org/wiki/Web_Proxy_Autodiscovery_Protocol, as accessed Jan. 18, 2017; Wikipedia.
Peyrott; Web-Proxy Auto Discovery (WPAD) Considered Harmful; Jul. 28, 2016; https://auth0.com/blog/heads-up-https-is-not-enough-when-using-wpad/, as accessed Jan. 18, 2017.

(Continued)

*Primary Examiner* — Michael Pyzocha
*Assistant Examiner* — Zoha Piyadehghibi Tafaghodi
(74) *Attorney, Agent, or Firm* — FisherBroyles, LLP

(57) ABSTRACT

A computer-implemented method for automatically blocking Web Proxy Auto-Discovery Protocol (WPAD) attacks may include (i) automatically detecting, by a computing device, a WPAD request for a configuration file, (ii) identifying, by the computing device, a server attempting to fulfill the WPAD request for the configuration file, (iii) determining, by the computing device, that the server is not included in a whitelist of WPAD servers for the configuration file, and (iv) automatically performing, by the computing device and based on the determination that the server is not included in the whitelist, a security action to secure the WPAD request for the configuration file. Various other methods, systems, and computer-readable media are also disclosed.

20 Claims, 7 Drawing Sheets

(56) References Cited

OTHER PUBLICATIONS

Hjelmvik; WPAD Man in the Middle; Jul. 17, 2012; http://www.netresec.com/?page=Blog&month=2012-07&post=WPAD-Man-in-the-Middle, as accessed Jan. 18, 2017.
Stockley; When domain names attack: the WPAD name collision vulnerability; May 25, 2016; https://nakedsecurity.sophos.com/2016/05/25/when-domain-names-attack-the-wpad-name-collision-vulnerability/, as accessed Jan. 18, 2017.
Seclists; Offer a new sig for detecting possible wpad Name Collision; May 31, 2016; http://seclists.org/snort/2016/q2/298, as accessed Jan. 18, 2017.
Gaffié; Responder 2.0—Owning Windows Networks part 3; Feb. 18, 2017; https://www.trustwave.com/Resources/SpiderLabs-Blog/Responder-2-0---Owning-Windows-Networks-part-3/, as accessed Jan. 18, 2017; Trustwave.

* cited by examiner

SYSTEMS AND METHODS FOR AUTOMATICALLY BLOCKING WEB PROXY AUTO-DISCOVERY PROTOCOL (WPAD) ATTACKS

BACKGROUND

The Web Proxy Auto-Discovery Protocol (WPAD) is often used to allow a client machine to automatically discover a configuration file and execute the file to configure the machine. For example, an organization may use the WPAD protocol to automatically configure multiple web browsers on multiple computing machines with the same policy. Client machines typically use WPAD to determine what network proxy server to use, based on the configuration file, through searching for a WPAD server. Unfortunately, attackers can create a malicious WPAD server, posing as a legitimate server, to attack an organization. Attackers can also set up a domain with a naming convention that a browser may mistake for a legitimate WPAD server. For example, using common hierarchical naming conventions through a Domain Name System (DNS) service, browsers may search for a Uniform Resource Locator (URL) that might be expected to lead to a WPAD server. An attacker may take control of a URL that could be included in this search and pose as a legitimate WPAD URL or data file. A client browser may then unknowingly allow the attacker access through downloading malicious files or accessing a fake WPAD server.

Traditional methods to deter WPAD attacks generally recommend discontinuing use of the WPAD protocol or modifying browsers to close loopholes. However, many systems may still rely on the use of WPAD. Other traditional security methods may require access to DNS servers or changes in infrastructure or browser behavior, which may not be feasible for clients. Furthermore, many methods are geared toward prevention of external WPAD attacks and do not consider the possibility of a local attack from within an organization or client network. The instant disclosure, therefore, identifies and addresses a need for improved systems and methods for automatically blocking WPAD attacks.

SUMMARY

As will be described in greater detail below, the instant disclosure describes various systems and methods for automatically blocking Web Proxy Auto-Discovery Protocol (WPAD) attacks. In one example, a computer-implemented method for automatically blocking WPAD attacks may include (i) automatically detecting, by a computing device, a WPAD request for a configuration file, (ii) identifying, by the computing device, a server attempting to fulfill the WPAD request for the configuration file, (iii) determining, by the computing device, that the server is not included in a whitelist of WPAD servers for the configuration file, and (iv) automatically performing, by the computing device and based on the determination that the server is not included in the whitelist, a security action to secure the WPAD request for the configuration file.

In some embodiments, automatically detecting the WPAD request may include monitoring WPAD requests from the computing device, detecting an attempt to connect to the server, determining that the server contains the configuration file, determining that a name of the server indicates the server is a WPAD server, determining that the server responds as a WPAD server, and/or detecting an application protocol request for the configuration file. In these embodiments, determining that the name of the server indicates the server is a WPAD server may include determining a machine name of the server indicates the server is a WPAD server and/or determining a domain name of the server indicates the server is a WPAD server.

In one embodiment, identifying the server attempting to fulfill the WPAD request may include determining that the computing device is the server. Alternatively, identifying the server attempting to fulfill the WPAD request may include determining that the server is a local machine. Additionally or alternatively, identifying the server attempting to fulfill the WPAD request may include performing a lookup in a name registry and/or detecting that the server fulfills the application protocol request.

In some examples, determining that the server is not included in the whitelist of WPAD servers may include determining that the WPAD request for the configuration file is a new WPAD request. Additionally or alternatively, determining that the server is not included in the whitelist of WPAD servers may include determining the whitelist does not include the name of the server, determining the whitelist does not include the application protocol request, and/or determining the whitelist does not include a script associated with the WPAD request.

In some embodiments, automatically performing the security action may include blocking the WPAD request for the configuration file and/or alerting an administrator about the WPAD request for the configuration file. In these embodiments, alerting the administrator about the WPAD request may include identifying a breach associated with the WPAD request and alerting the administrator about the security breach.

In one example, the computer-implemented method may further include receiving verification from the administrator that the server is a legitimate WPAD server and/or receiving verification from the administrator that a script associated with the WPAD request is legitimate. In this example, the computer-implemented method may also further include adding the server to the whitelist in response to verifying the server and/or adding the script to the whitelist in response to verifying the script.

In one embodiment, a system for implementing the above-described method may include (i) a detection module, stored in memory, that automatically detects, by a computing device, a WPAD request for a configuration file, (ii) an identification module, stored in memory, that identifies, by the computing device, a server attempting to fulfill the WPAD request for the configuration file, (iii) a determination module, stored in memory, that determines, by the computing device, that the server is not included in a whitelist of WPAD servers for the configuration file, and (iv) a performance module, stored in memory, that automatically performs, by the computing device and based on the determination that the server is not included in the whitelist, a security action to secure the WPAD request for the configuration file. In addition, the system may include at least one processor that executes the detection module, the identification module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) automatically detect a WPAD request for a configuration file, (ii) identify a server attempting to fulfill the WPAD request for the configuration file, (iii) determine that the server is not included in a whitelist of WPAD servers for the configuration file, and (iv) automatically perform, based on the determination that the server is not included in the whitelist, a security action to secure the WPAD request for the configuration file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
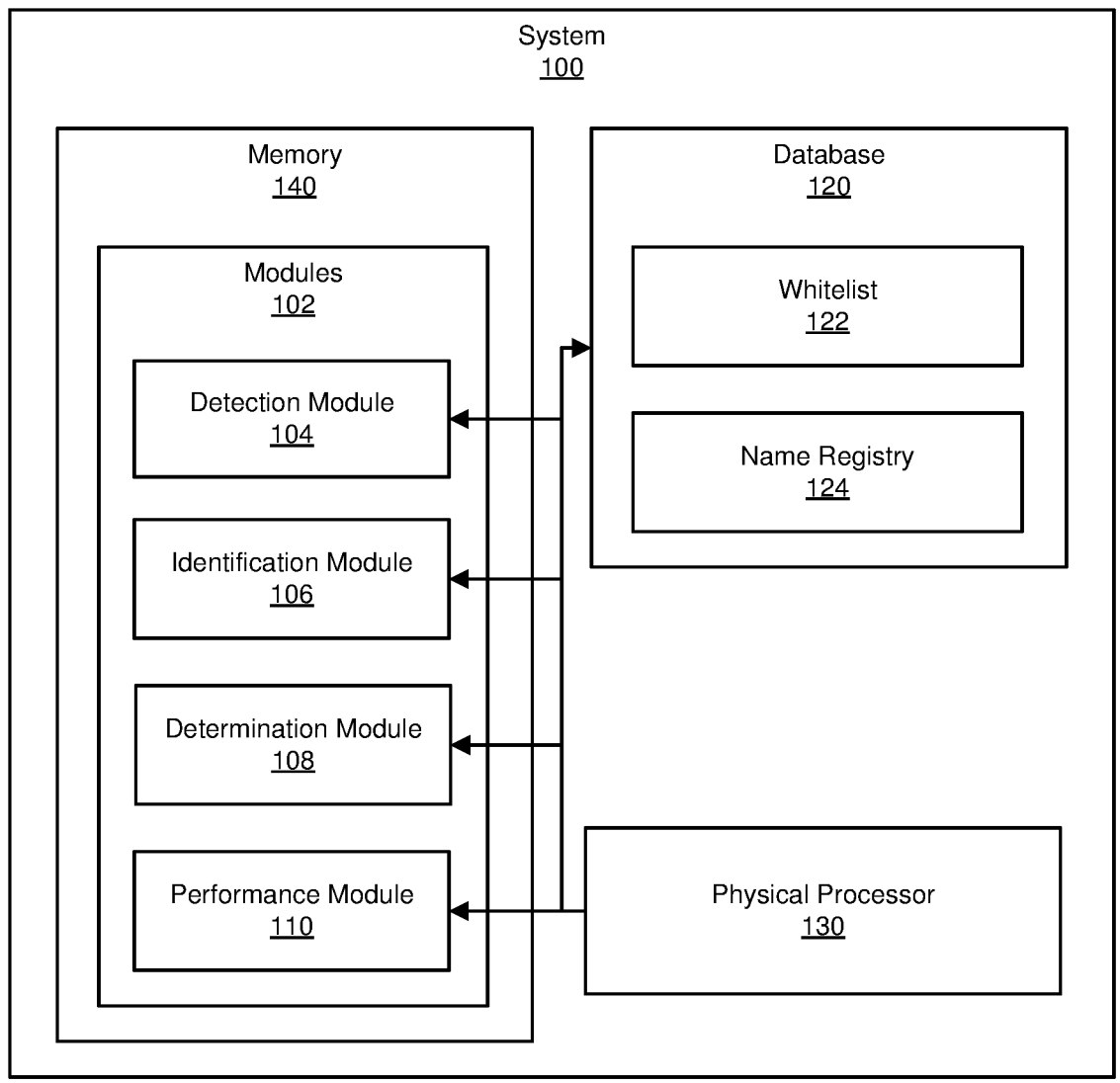
FIG. 1 is a block diagram of an example system for automatically blocking Web Proxy Auto-Discovery Protocol (WPAD) attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for automatically blocking Web Proxy Auto-Discovery Protocol (WPAD) attacks. As will be explained in greater detail below, by monitoring WPAD requests from client machines, the systems and methods described herein may evaluate attempts to connect to WPAD servers that may be malicious and prevent attacks from malicious servers. For example, by identifying a request for a new WPAD server, which may be rare and potentially suspicious, the disclosed systems and methods may isolate suspicious requests and changes to known WPAD servers for in-depth analysis. Furthermore, by maintaining a whitelist of legitimate WPAD servers and related information, the disclosed systems and methods may better protect against malicious WPAD attacks by comparing new requests with known configurations.

In addition, the systems and methods described herein may improve the functioning of a computing device by preventing attacks from potentially malicious WPAD servers or malicious data files before they occur. These systems and methods may also improve the fields of network security and/or cybersecurity by automatically detecting WPAD changes or new WPAD activity and enacting more stringent security measures for such activity. Thus, these systems and methods may provide client machines with better protection against both local and remote WPAD attacks.

Figure 2:
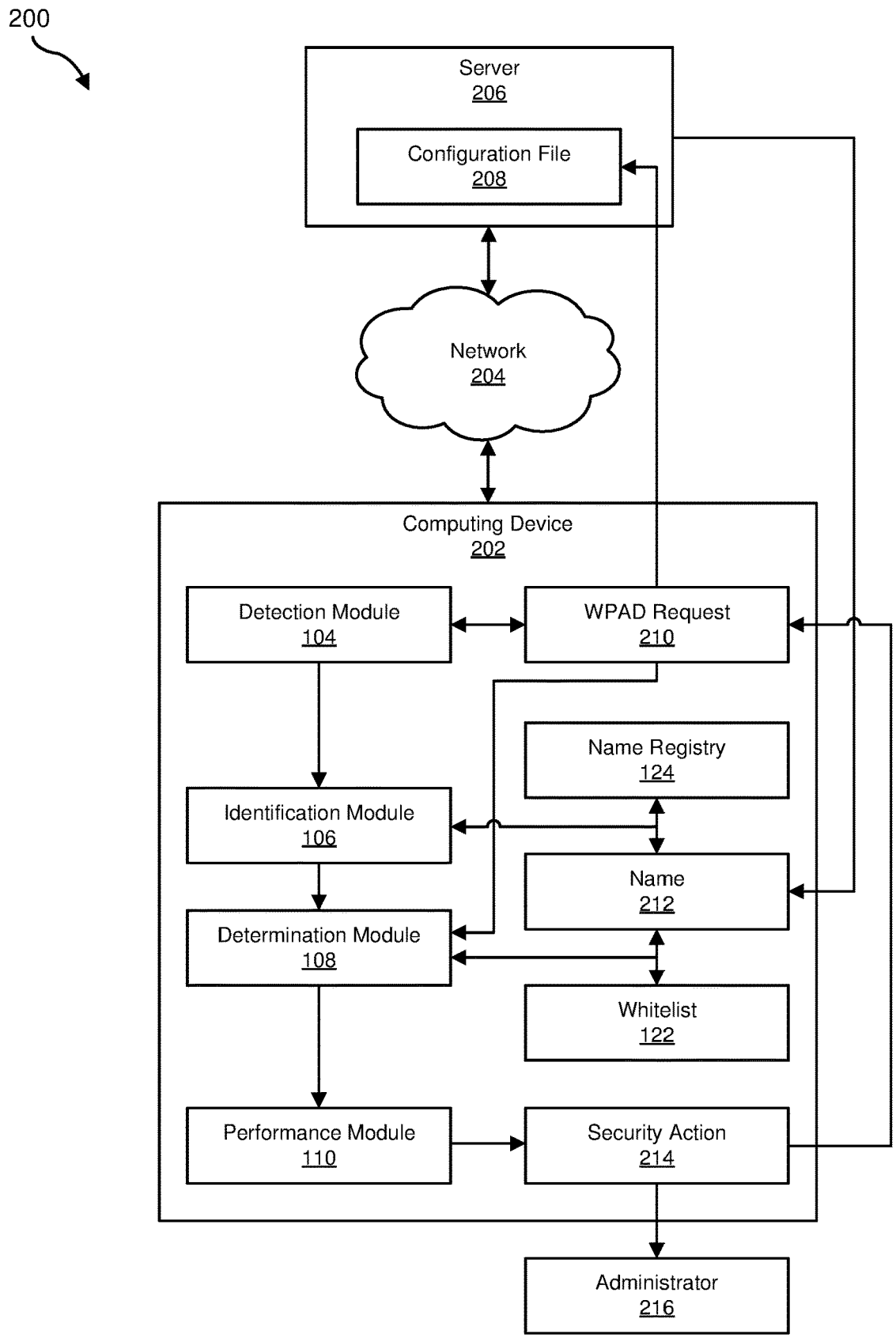
FIG. 2 is a block diagram of an additional example system for automatically blocking WPAD attacks.

The following will provide, with reference to FIGS. 1 and 2, detailed descriptions of example systems for automatically blocking WPAD attacks. Detailed descriptions of corresponding computer-implemented methods will also be provided in connection with FIG. 3. In addition, detailed descriptions of an example whitelist that does not include an example application protocol request will be provided in connection with FIG. 4. Furthermore, detailed descriptions of an example administrator verification and an example updated whitelist will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of example system 100 for automatically blocking WPAD attacks. As used herein, the terms "Web Proxy Auto-Discovery Protocol" or "WPAD" generally refer to a standard protocol for client machines or web browsers to locate a configuration file, such as by identifying its URL or web address. Consequently, the terms "WPAD request" and "WPAD server," as used herein, generally refer to a request for a configuration file or the location of the configuration file and a server that hosts the configuration file, respectively. The term "configuration file," as used herein, generally refers to a data file that contains standard settings for a client machine or browser. Notably, a configuration file used with the WPAD protocol may provide a standard proxy policy. For example, a common configuration file format for the WPAD protocol may include a proxy auto-config (PAC) file that dictates rules for selecting an appropriate proxy server for a given URL or web address.

As illustrated in FIG. 1, example system 100 may include one or more modules 102 for performing one or more tasks. For example, and as will be explained in greater detail below, modules 102 may include a detection module 104 that automatically detects, by a computing device, a WPAD request for a configuration file. Modules 102 may additionally include an identification module 106 that identifies, by the computing device, a server attempting to fulfill the WPAD request for the configuration file. Modules 102 may also include a determination module 108 that determines, by the computing device, that the server is not included in a whitelist of WPAD servers for the configuration file. Modules 102 may further include a performance module 110 that automatically performs, by the computing device and based on the determination that the server is not included in the whitelist, a security action to secure the WPAD request for the configuration file. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks. Although illustrated as part of computing device 202 in FIG. 2, one or more of modules 102 in FIG. 1 may be executed by a separate computing device to manage computing device 202.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatically blocking WPAD attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a whitelist 122, which may include information about verified WPAD servers, and/or a name registry 124, which may include a registry of machine or domain names. Database 120 may represent portions of a single database or computing device or a plurality of databases or computing devices. For example, database 120 may represent a portion of computing device 202 in FIG. 2. Alternatively, database 120 in FIG. 1 may represent one or more physically separate devices capable of being accessed by a computing device, such as computing device 202 in FIG. 2. Database 120 may also represent a portion of one or more separate devices capable of being accessed by a computing device, such as computing device 202 in FIG. 2. For example, whitelist 122 and name registry 124 may reside on separate devices accessible by computing device 202 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202. All or a portion of the functionality of modules 102 may alternately be performed by additional suitable computing devices or systems not illustrated in FIG. 2.

As will be described in greater detail below, one or more of modules 102 from FIG. 1 may, when executed by at least one processor of computing device 202, enable computing device 202 to prevent malicious WPAD attacks. For example, and as will be described in greater detail below, detection module 104 may automatically detect a WPAD request 210 for a configuration file 208. Identification module 106 may identify server 206 attempting to fulfill WPAD request 210 for configuration file 208. Determination module 108 may determine that server 206 is not included in whitelist 122 of WPAD servers for configuration file 208. Performance module 110 may automatically perform, based on the determination that server 206 is not included in whitelist 122, a security action 214 to secure WPAD request 210 for configuration file 208.

In the example of FIG. 2, and as will be explained in greater detail below, computing device 202 may first detect WPAD request 210 for configuration file 208 on server 206. Computing device 202 may then detect a name 212 of server 206 via network 204 and perform a lookup in name registry 124 to identify server 206. Next, computing device 202 may determine that name 212 of server 206 is not included in whitelist 122 and, therefore, server 206 is not included in whitelist 122. Finally, computing device 202 may perform security action 214 to block WPAD request 210 and alert an administrator 216 about WPAD request 210.

Computing device 202 generally represents any type or form of computing device capable of reading computer-executable instructions. For example, computing device 202 may represent an endpoint device running client-side software and/or web browsers. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Server 206 generally represents any type or form of computing device capable of storing data files. For example, server 206 may represent a WPAD server that hosts a configuration file and services configuration lookups. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
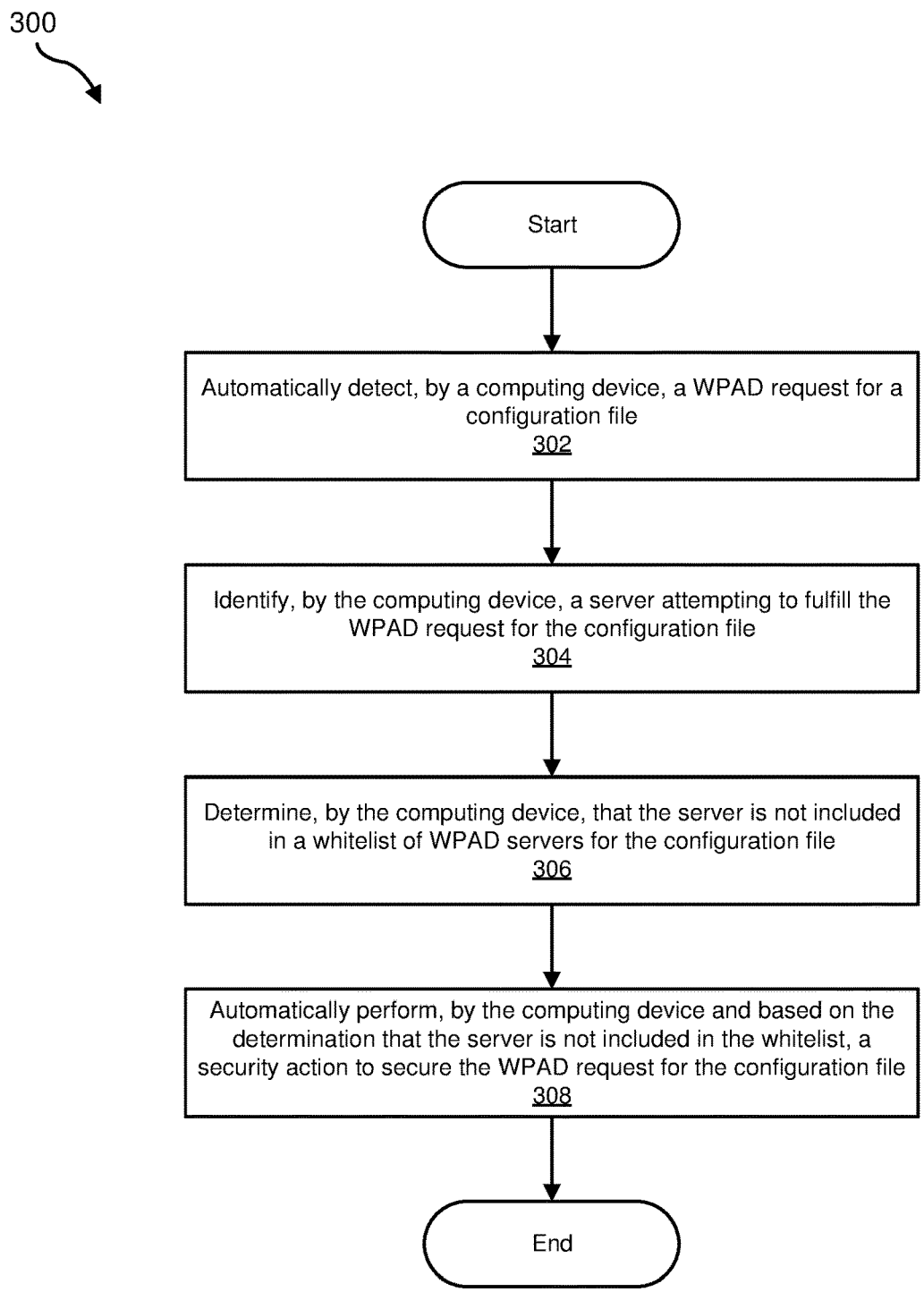
FIG. 3 is a flow diagram of an example method for automatically blocking WPAD attacks.

FIG. 3 is a flow diagram of an example computer-implemented method 300 for automatically blocking Web Proxy Auto-Discovery Protocol (WPAD) attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may automatically detect, by a computing device, a WPAD request for a configuration file. For example, detection module 104 may, as part of computing device 202 in FIG. 2, automatically detect WPAD request 210 for configuration file 208.

Detection module 104 may detect WPAD request 210 in a variety of ways. In some examples, detection module 104 may automatically detect WPAD request 210 by monitoring WPAD requests from computing device 202, detecting an attempt to connect to server 206, determining that server 206 contains configuration file 208, determining that a name of server 206, such as name 212, indicates server 206 is a WPAD server, determining that server 206 responds as a WPAD server, and/or detecting an application protocol request for configuration file 208. The term "application protocol," as used herein, generally refers to a protocol used in a communication network to facilitate transfer of information. Examples of application protocols may include, but are not limited to, File Transfer Protocol (FTP), Hypertext Transfer Protocol (HTTP), DNS protocols, variations or combinations of one or more of the same, and/or any other suitable protocols. In the example of FIG. 2, computing device 202 may monitor outgoing WPAD requests for configuration files and detect WPAD request 210. Computing device 202 may then determine that WPAD request 210 is requesting configuration file 208 from server 206 and that name 212 of server 206 indicates server 206 is a WPAD server.

In the above examples, detection module 104 may determine that the name of server 206 indicates server 206 is a WPAD server by determining a machine name of server 206 indicates a WPAD server and/or determining a domain name of server 206 indicates server 206 is a WPAD server. The term "machine name," as used herein, generally refers to a readable name or string of characters given to a specific computing device to identify the device. The machine name of server 206 may indicate server 206 is a WPAD server by including the words "WPAD" and/or "server." The term "domain name," as used herein, generally refers to a portion of a network address that identifies a domain through the DNS. The domain name of server 206 may indicate server 206 is a WPAD server by including "wpad" within its network address.

In other examples, detection module 104 may determine that server 206 responds as a WPAD server based on a response to a request or command. For example, server 206 may respond to a Network Basic Input/Output System (NetBIOS) request for a WPAD server, despite not having a name of a WPAD server. In these examples, server 206 may act as a WPAD server or attempt to respond to requests for a WPAD server.

Figure 4:
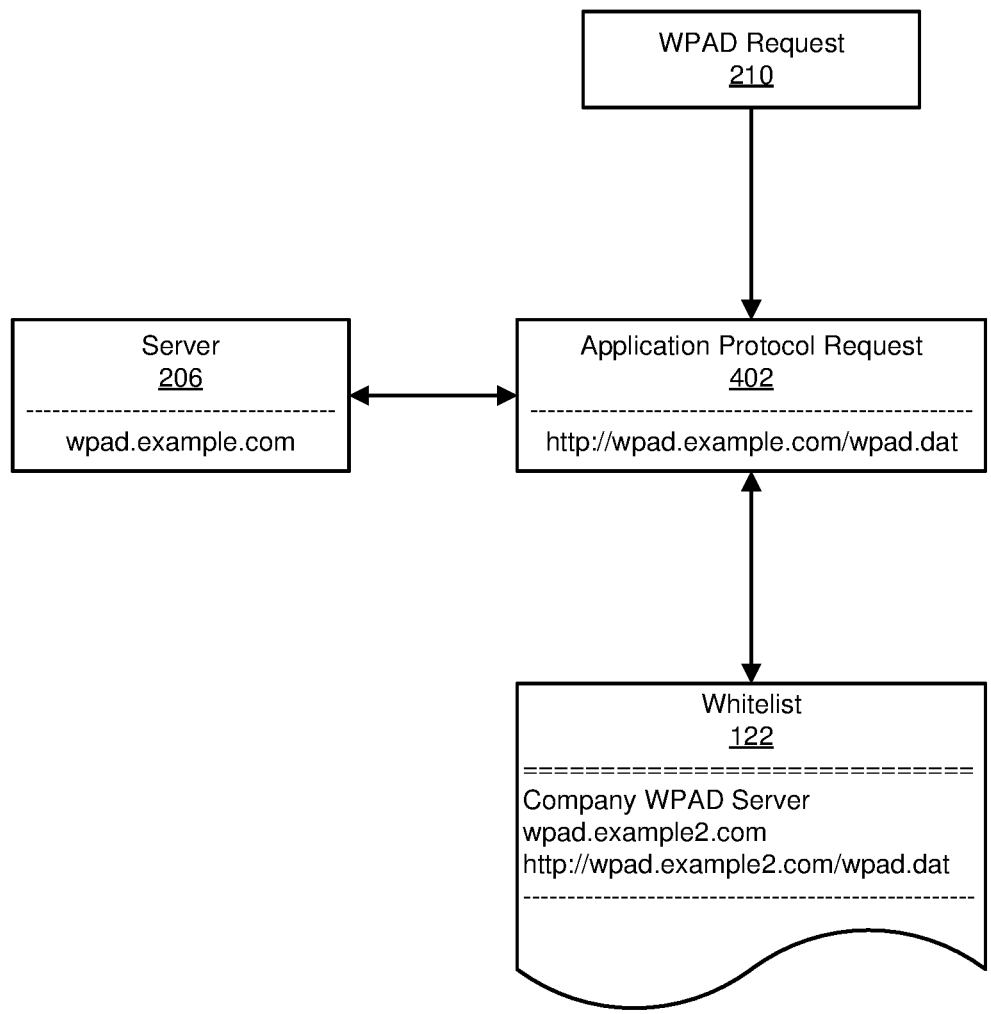
FIG. 4 is a block diagram of an example whitelist that does not include an example application protocol request.

As illustrated in FIG. 4, detection module 104 may alternately detect WPAD request 210 by detecting an application protocol request 402 that requests a specific data file from a specific URL (e.g., "http://wpad.example.com/wpad-.dat"). Detection module 104 may also determine server 206 to host the URL that includes the requested data file (e.g., "wpad.example.com"). In this example, detection module 104 may use the domain name of server 206 to identify it as a WPAD server.

Returning to FIG. 3, at step 304, one or more of the systems described herein may identify, by the computing device, a server attempting to fulfill the WPAD request for the configuration file. For example, identification module 106 may, as part of computing device 202 in FIG. 2, identify server 206 attempting to fulfill WPAD request 210 for configuration file 208.

Identification module 106 may identify server 206 in a variety of ways. In one embodiment, identification module 106 may identify server 206 attempting to fulfill WPAD request 210 by determining that computing device 202 and server 206 are the same machine. In this embodiment, computing device 202 may attempt to act as a WPAD server, which may indicate computing device 202 is compromised. In another embodiment, identification module 106 may identify server 206 by determining that server 206 is a local machine. In this embodiment, identification module 106 may search for WPAD servers on a local network, such as network 204, and identify server 206 as a potential WPAD server in the local network.

Additionally or alternatively, identification module 106 may perform a lookup in a name registry, such as name registry 124, and/or detect that server 206 fulfills an application protocol request, such as application protocol request 402 in FIG. 4. In the example of FIG. 2, identification module 106 may search for name 212 of server 206 in name registry 124, which may include a list of local machine names, and determine the identity of server 206 that hosts configuration file 208. In the example of FIG. 4, identification module 106 may perform a lookup of server 206 in a domain name registry to identify server 206 as the server that would fulfill application protocol request 402 for configuration file 208.

Returning to FIG. 3, at step 306, one or more of the systems described herein may determine, by the computing device, that the server is not included in a whitelist of WPAD servers for the configuration file. For example, determination module 108 may, as part of computing device 202 in FIG. 2, determine that server 206 is not included in whitelist 122 of WPAD servers for configuration file 208.

Determination module 108 may determine that server 206 is not included in whitelist 122 in a variety of ways. In one example, determination module 108 may determine that server 206 is not included in whitelist 122 by determining that WPAD request 210 for configuration file 208 is a new WPAD request. In this example, any new WPAD request may be considered suspicious by the systems described herein under the assumption that new WPAD servers are rarely created. WPAD request 210 may be considered new if the request is for a new WPAD server and/or a new configuration file, or all WPAD requests may be considered new if they require a configuration change.

In another example, determination module 108 may determine whitelist 122 does not include name 212 of server 206, the application protocol request for configuration file 208, and/or a script associated with WPAD request 210. The term "script," as used herein, generally refers to a computing program or command that automatically executes a task on a computing device. The script associated with WPAD request 210 may include commands to execute configuration file 208 or other functionality, such as browser settings. In the example of FIG. 4, determination module 108 may determine that neither the domain name of server 206 (e.g., "wpad.example.com") nor the data file requested by application protocol request 402 (e.g., "http://wpad.example.com/wpad.dat") are included in whitelist 122 (e.g., "Company WPAD Server," "wpad.example 2.com," and "http://wpad.example 2.com/wpad.dat").

Furthermore, in alternate examples, whitelist 122 may list WPAD servers for specific configuration files. In these examples, determination module 108 may determine that server 206 is not included in whitelist 122 of WPAD servers for configuration file 208, though server 206 may be included in whitelist 122 for a different configuration file. Thus, server 206 may be considered suspicious for a potentially malicious configuration file despite being a valid WPAD server for a benign configuration file.

Returning to FIG. 3, at step 308, one or more of the systems described herein may automatically perform, by the computing device and based on the determination that the server is not included in the whitelist, a security action to secure the WPAD request for the configuration file. For example, performance module 110 may, as part of computing device 202 in FIG. 2, automatically perform, based on the determination that server 206 is not included in whitelist 122, security action 214 to secure WPAD request 210 for configuration file 208.

Performance module 110 may perform security action 214 in a variety of ways. In some embodiments, performance module 110 may automatically perform security action 214 by blocking WPAD request 210. Additionally or alternatively, performance module 110 may alert an administrator, such as administrator 216, about WPAD request 210. In these embodiments, performance module 110 may alert administrator 216 about WPAD request 210 by identifying a security breach associated with WPAD request 210 and alerting administrator 216 about the security breach. The term "security breach," as used herein, generally refers to an event or incident that causes an attack or unauthorized access to a computing machine. For example, performance module 110 may determine that sensitive data is accessed by an unauthorized machine after configuration file 208 is downloaded from server 206. Performance module 110 may then alert administrator 216 about the unauthorized data access and suspicious configuration file 208.

In some examples, the systems described herein may further include receiving verification from administrator 216 that server 206 is a legitimate WPAD server and/or receiving verification from administrator 216 that a script associated with WPAD request 210 is legitimate. For example, administrator 216 may review WPAD request 210 and determine that server 206 is a verified new WPAD server.

Figure 5:
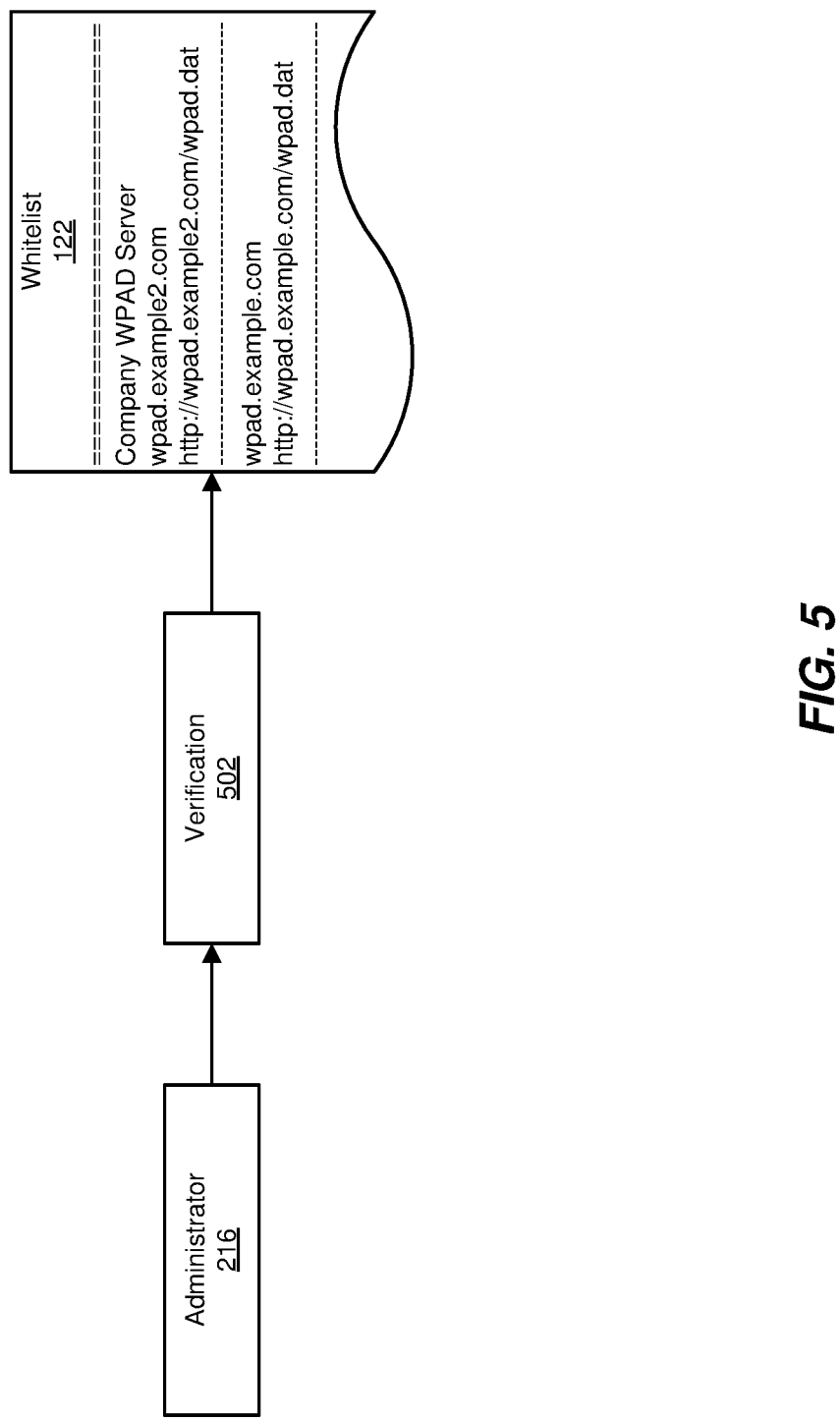
FIG. 5 is a block diagram of an example administrator verification and an example updated whitelist.

In one embodiment, the systems described herein may also include adding server 206 to whitelist 122 in response to verifying server 206 and/or adding the script associated with WPAD request 210 to whitelist 122 in response to verifying the script. In this embodiment, after receiving verification from administrator 216, the systems described herein may automatically update whitelist 122 to include the verified information. As illustrated in FIG. 5, administrator 216 may send a verification 502 to computing device 202. In response, computing device 202 may then update whitelist 122 with the domain name of server 206 (e.g., "wpad.example.com") and application protocol request 402 (e.g., "http://wpad.example.com/wpad.dat") from FIG. 4.

Initially, whitelist 122 may not include any verified WPAD servers, and the systems described herein may not block WPAD requests. After updating whitelist 122 with current WPAD servers, the systems described herein may eventually be able to block all subsequent WPAD requests, depending on required security settings for computing device 202. For example, administrator 216 may first decide to relax security settings to allow for potential new WPAD server and may allow review of each WPAD request separately. After a period of time, administrator 216 may determine all verified WPAD servers have been included in whitelist 122, and any additional WPAD request may be considered suspicious and automatically blocked by the systems described herein.

As explained above in connection with method 300 in FIG. 3, the disclosed systems and methods may, by automatically detecting new WPAD requests, improve security protection against WPAD attacks. Specifically, the disclosed systems and methods may maintain a whitelist of known WPAD servers and related information. By monitoring all WPAD requests for configuration files, the systems and methods described herein may compare each WPAD requests with the whitelist of known WPAD servers and flag unknown servers or configuration files as possible WPAD attacks.

By automatically performing security actions in response to potentially vulnerable WPAD requests, the disclosed systems and methods may then further protect computing devices from attacks by malicious servers. In some examples, the systems and methods described herein may also protect against compromised local machines and server that may pose as WPAD servers. Additionally, the systems and methods described herein may protect against malicious data files by preventing the download of malicious files posing as configuration files.

As detailed above, by maintaining a whitelist of WPAD servers, the disclosed systems and methods may more easily detect changes and new WPAD activity that may indicate security breaches. Furthermore, by allowing the whitelist to be updated with new legitimate WPAD servers, the disclosed systems and methods may accurately block suspicious servers and data files while allowing legitimate WPAD requests. Thus, the systems and methods described herein may improve the detection and prevention of WPAD attacks.

Figure 6:
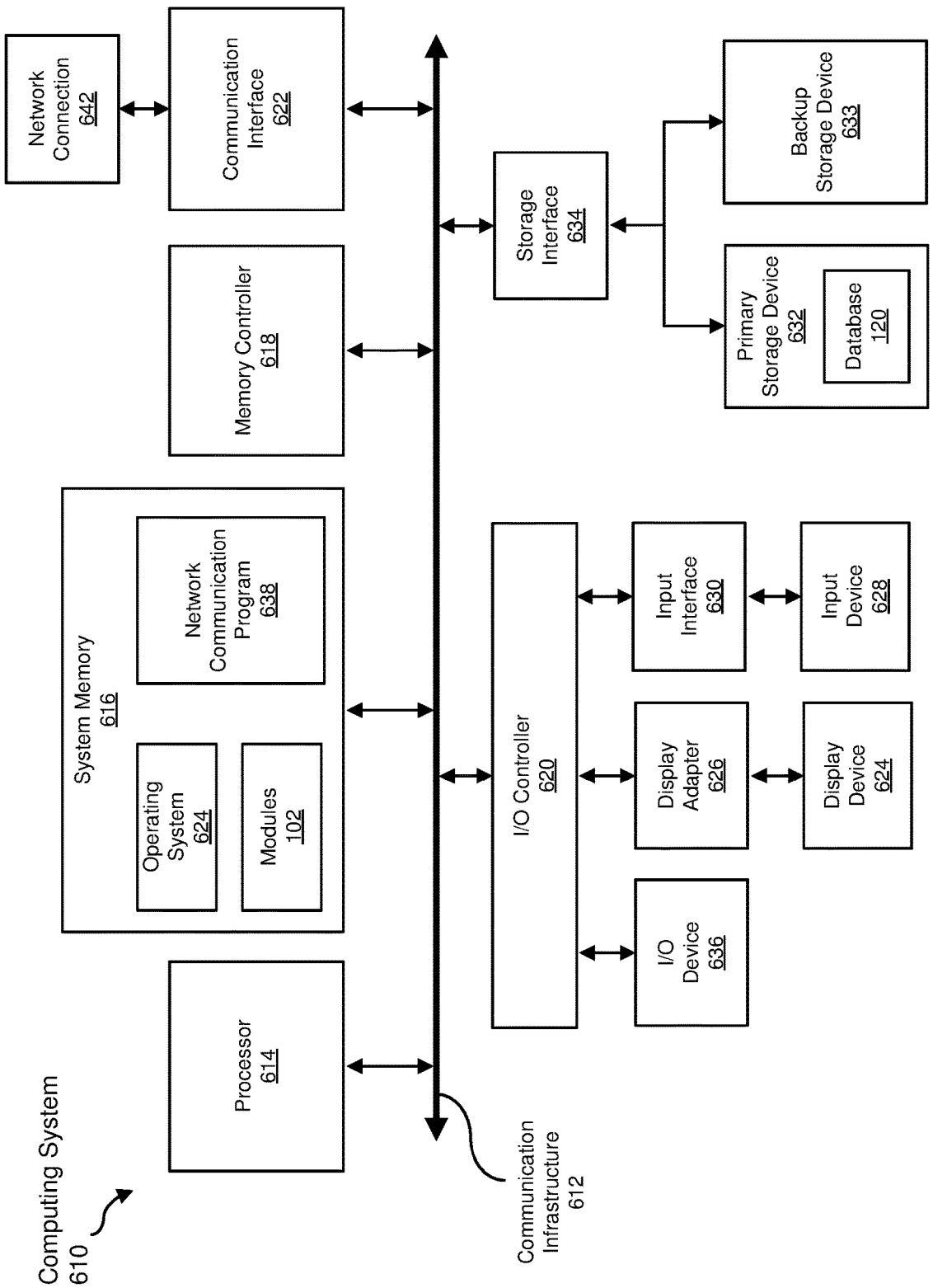
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
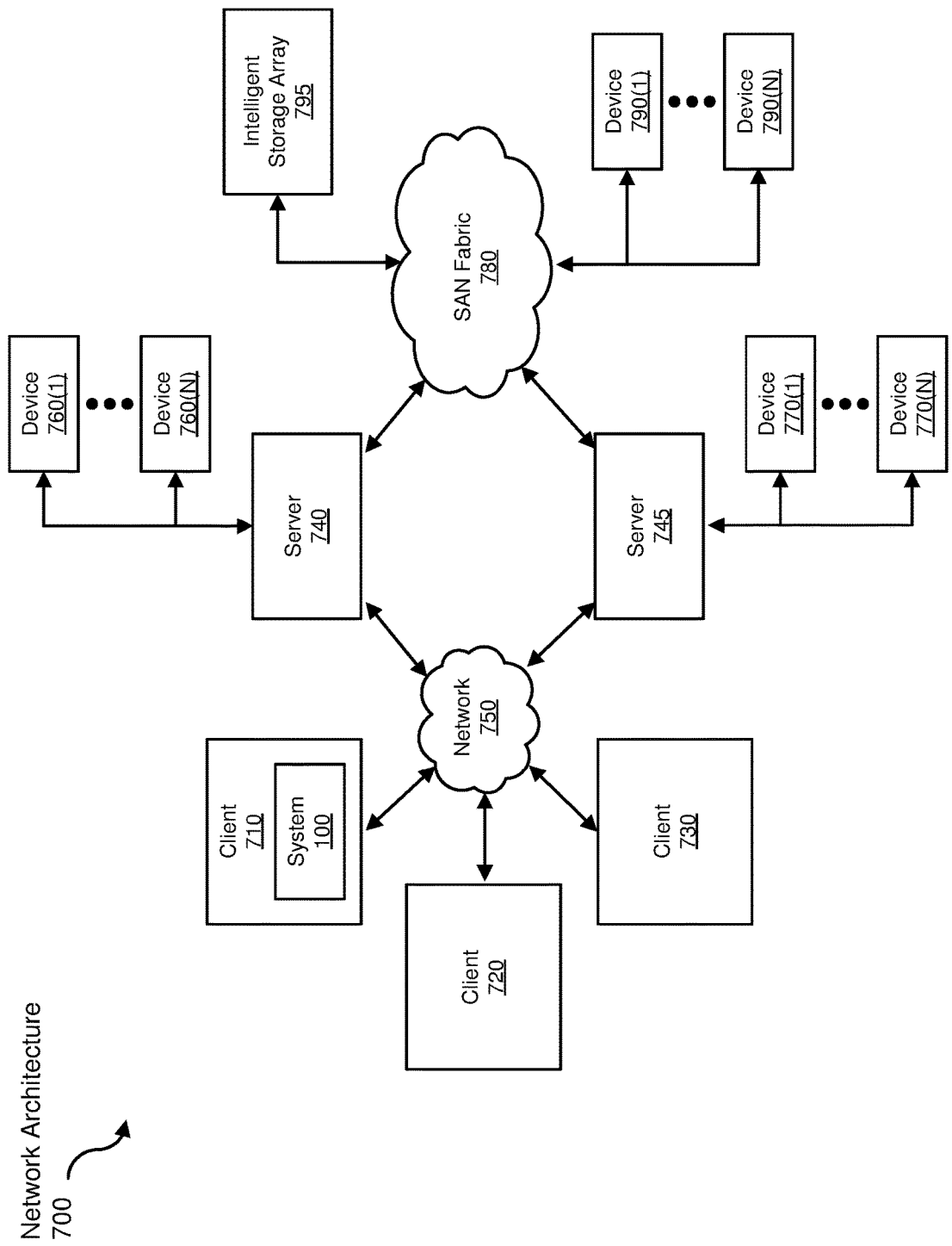
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for automatically blocking WPAD attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a whitelist of WPAD servers to be transformed, transform the whitelist, output a result of the transformation to a storage or output device, use the result of the transformation to determine if a WPAD server is potentially malicious, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically blocking Web Proxy Auto-Discovery Protocol (WPAD) attacks, at least a portion of the method being performed by a computing device comprising at least one processor, the method comprising:
    automatically detecting, by the computing device, a WPAD request for a configuration file, wherein the configuration file includes a policy for selecting proxy servers;
    identifying, by the computing device, a server attempting to fulfill the WPAD request for the configuration file, wherein the server poses as a WPAD server;
    determining, by the computing device, that the server is not included in a whitelist of legitimate WPAD servers for the configuration file and that the WPAD request for the configuration file is, therefore, suspicious for the server posing as the WPAD server; and
    automatically performing, by the computing device and based on the determination that the WPAD request for the configuration file is suspicious for the server, a security action to secure the computing device against a potential WPAD attack caused by the suspicious WPAD request for the configuration file.

2. The method of claim 1, wherein automatically detecting the WPAD request comprises at least one of:
    monitoring WPAD requests from the computing device;
    detecting an attempt to connect to the server;
    determining that the server contains the configuration file;
    determining that a name of the server indicates the server is a WPAD server;
    determining that the server responds as a WPAD server; and
    detecting an application protocol request for the configuration file.

3. The method of claim 2, wherein determining that the name of the server indicates the server is a WPAD server comprises at least one of:
    determining a machine name of the server indicates the server is a WPAD server; and
    determining a domain name of the server indicates the server is a WPAD server.

4. The method of claim 2, wherein identifying the server attempting to fulfill the WPAD request comprises at least one of:
    determining that the computing device is the server;
    determining that the server is a local machine;
    performing a lookup in a name registry; and
    detecting that the server fulfills the application protocol request.

5. The method of claim 2, wherein determining that the server is not included in the whitelist of legitimate WPAD servers comprises at least one of:
    determining that the WPAD request for the configuration file is a new WPAD request;
    determining the whitelist does not include the name of the server;
    determining the whitelist does not include the application protocol request; and
    determining the whitelist does not include a script associated with the WPAD request.

6. The method of claim 1, wherein automatically performing the security action comprises at least one of:
   blocking the suspicious WPAD request for the configuration file; and
   alerting an administrator about the suspicious WPAD request for the configuration file.

7. The method of claim 6, wherein alerting the administrator about the suspicious WPAD request comprises:
   identifying at least one security breach associated with the suspicious WPAD request; and
   alerting the administrator about the security breach.

8. The method of claim 6, further comprising at least one of:
   receiving verification from the administrator that the server is a legitimate WPAD server; and
   receiving verification from the administrator that a script associated with the WPAD request is legitimate.

9. The method of claim 8, further comprising at least one of:
   adding the server to the whitelist in response to verifying the server; and
   adding the script to the whitelist in response to verifying the script.

10. A system for automatically blocking Web Proxy Auto-Discovery Protocol (WPAD) attacks, the system comprising:
    a detection module, stored in memory, that automatically detects, by a computing device, a WPAD request for a configuration file, wherein the configuration file includes a policy for selecting proxy servers;
    an identification module, stored in memory, that identifies, by the computing device, a server attempting to fulfill the WPAD request for the configuration file, wherein the server poses as a WPAD server;
    a determination module, stored in memory, that determines, by the computing device, that the server is not included in a whitelist of legitimate WPAD servers for the configuration file and that the WPAD request for the configuration file is, therefore, suspicious for the server posing as the WPAD server;
    a performance module, stored in memory, that automatically performs, by the computing device and based on the determination that the WPAD request for the configuration file is suspicious for the server, a security action to secure the computing device against a potential WPAD attack caused by the suspicious WPAD request for the configuration file; and
    at least one processor that executes the detection module, the identification module, the determination module, and the performance module.

11. The system of claim 10, wherein the detection module automatically detects the WPAD request by at least one of:
    monitoring WPAD requests from the computing device;
    detecting an attempt to connect to the server;
    determining that the server contains the configuration file;
    determining that a name of the server indicates the server is a WPAD server;
    determining that the server responds as a WPAD server; and
    detecting an application protocol request for the configuration file.

12. The system of claim 11, wherein determining that the name of the server indicates the server is a WPAD server comprises at least one of:
    determining a machine name of the server indicates the server is a WPAD server; and
    determining a domain name of the server indicates the server is a WPAD server.

13. The system of claim 11, wherein the identification module identifies the server attempting to fulfill the WPAD request by at least one of:
    determining that the computing device is the server;
    determining that the server is a local machine;
    performing a lookup in a name registry; and
    detecting that the server fulfills the application protocol request.

14. The system of claim 11, wherein the determination module determines that the server is not included in the whitelist of legitimate WPAD servers by at least one of:
    determining that the WPAD request for the configuration file is a new WPAD request;
    determining the whitelist does not include the name of the server;
    determining the whitelist does not include the application protocol request; and
    determining the whitelist does not include a script associated with the WPAD request.

15. The system of claim 10, wherein the performance module automatically performs the security action by at least one of:
    blocking the suspicious WPAD request for the configuration file; and
    alerting an administrator about the suspicious WPAD request for the configuration file.

16. The system of claim 15, wherein alerting the administrator about the suspicious WPAD request comprises:
    identifying at least one security breach associated with the suspicious WPAD request; and
    alerting the administrator about the security breach.

17. The system of claim 15, further comprising at least one of:
    receiving verification from the administrator that the server is a legitimate WPAD server; and
    receiving verification from the administrator that a script associated with the WPAD request is legitimate.

18. The system of claim 17, further comprising at least one of:
    adding the server to the whitelist in response to verifying the server; and
    adding the script to the whitelist in response to verifying the script.

19. A non-transitory computer-readable medium comprising one or more computer-executable instructions that, when executed by at least one processor of a computing device, cause the computing device to:
    automatically detect, by the computing device, a WPAD request for a configuration file, wherein the configuration file includes a policy for selecting proxy servers;
    identify, by the computing device, a server attempting to fulfill the WPAD request for the configuration file, wherein the server poses as a WPAD server;
    determine, by the computing device, that the server is not included in a whitelist of legitimate WPAD servers for the configuration file and that the WPAD request for the configuration file is, therefore, suspicious for the server posing as the WPAD server; and
    automatically perform, by the computing device and based on the determination that the WPAD request for the configuration file is suspicious for the server, a security action to secure the computing device against a potential WPAD attack caused by the suspicious WPAD request for the configuration file.

20. The non-transitory computer-readable medium of claim 19, wherein the computer-executable instructions cause the computing device to automatically detect the WPAD request by at least one of:
  monitoring WPAD requests from the computing device;
  detecting an attempt to connect to the server;
  determining that the server contains the configuration file;
  determining that a name of the server indicates the server is a WPAD server;
  determining that the server responds as a WPAD server; and
  detecting an application protocol request for the configuration file.

* * * * *